United States Patent Office 2,761,188
Patented Sept. 4, 1956

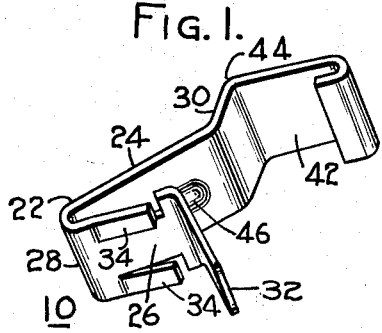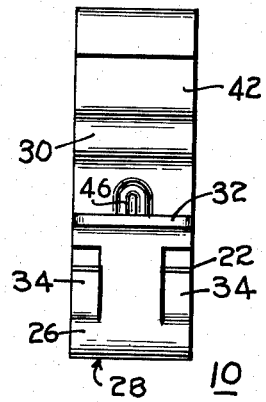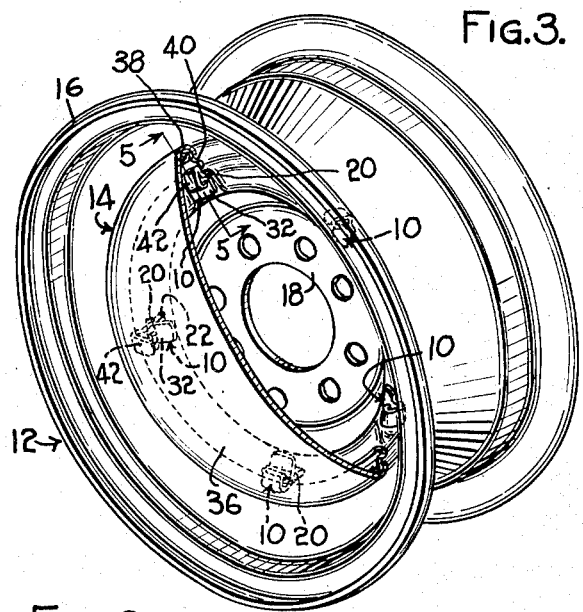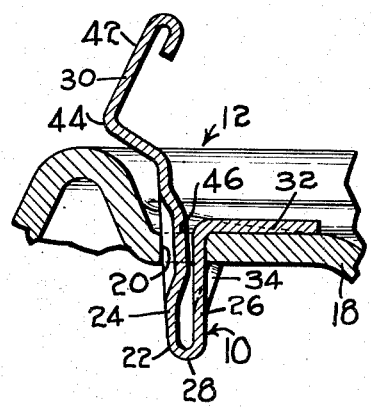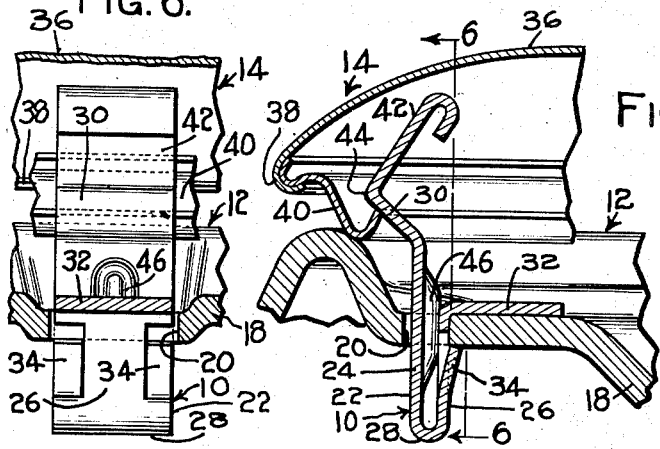
INVENTOR:
WILLIAM A. BEDFORD JR.,
By Robert E Ross
ATTORNEY.

2,761,188

FASTENING DEVICE

William A. Bedford, Jr., North Scituate, Mass., assignor, by mesne assignments, to United-Carr Fastener Corporation, Boston, Mass., a corporation of Delaware Application November 21, 1952, Serial No. 321,788

2 Claims. (Cl. 24—73)

This invention relates generally to fastening devices, and has particular reference to a fastening device for assembly into a support aperture, and to a fastener assembly comprising a series of such fasteners arranged to receive a cover or the like in snapping engagement.

Wheels for automobiles are ordinarily provided with a series of spring tongues riveted thereon so as to receive a hub cap in snapping engagement. However, wheels on some models are provided with so-called wheel covers which extend over substantially the entire center portion of the wheel. This latter type of cover is provided with means for engaging the outer rim portion of the wheel and cannot be assembled if the spring tongues for engaging a hub cap are present on the wheel.

Hence, during the manufacture of automobiles, it has been necessary to have available on the assembly line two types of wheels, one type with spring tongues riveted thereon for receiving a hub cap, and another type with the spring tongues omitted, for receiving a wheel cover.

In addition to the storage problem, there is also the problem of determining, at the time of assembly of the wheel, the ultimate color and style of the particular vehicle being assembled so that the proper color and type of wheel can be mounted thereon. Errors frequently occur, which requires changing the wheels at a later point in the assembly.

The object of the invention is to provide fastening means which may be readily attached to the wheel at the final assembly point on the line, thus eliminating need for two types of wheel.

A further object of the invention is to provide a fastening device for assembly into an apertured support, which has shoulder means projecting from the support so that a series of such fastening devices may be assembled onto the support to receive a cover in snapping engagement.

Another object of the invention is to provide a fastening device in which a U-shaped stud-like portion for snapping into a support aperture is provided with a resilient shouldered member extending from one arm of the U-shaped portion, and a lateral extension is disposed on the other arm for bearing against the support to resist tilting of the fastener in the opening when a cover or the like is snapped onto the shouldered member.

Other objects of the invention will, in part, be obvious and will, in part, appear hereinafter.

In the drawing:

Fig. 1 is a perspective view of a fastening device embodying the features of the invention;

Fig. 2 is a view in elevation of the fastening device of Fig. 1;

Fig. 3 is a perspective view of an automobile wheel having fasteners as shown in Figs. 1 and 2 assembled thereon;

Fig. 4 is a view in section of the fastening device of Fig. 1 assembled into the wheel;

Fig. 5 is a view in section, similar to Fig. 4, taken on line 5—5 of Fig. 3 in which a hub cap has been assembled onto the wheel;

Fig. 6 is a view in section taken on line 6—6 of Fig. 5.

Referring to the drawing, there is illustrated a fastening device 10 which is adapted for assembly with a support 12 such as an automobile wheel or the like so that a series of such fasteners can receive a hub cap 14 or other decorative cover device in snapping engagement.

The support 12, in the illustrated embodiment, comprises an outer rim portion 16 and a central web portion 18, having a series of slots 20 disposed thereabout in substantially circular configuration.

The fasteners 10 are preferably formed of a single piece of sheet metal and comprise generally a U-shaped stud-like portion 22, formed by a pair of colateral legs 24 and 26, joined at one end 28, a resilient extension 30 disposed on the leg 24, and a laterally extending portion 32 disposed on the leg 26.

The legs 24 and 26 are initially disposed at a slight angle, and the slots 20 are so dimensioned that the legs must flex together to enter a slot.

To provide means for retaining a fastener in the aperture, the leg 26 is provided with a pair of tongues 34 which extend away from the joined end 28 and are inclined slightly outwardly from the leg 26.

The hub cap 14 for assembly onto the wheel comprises an outer domed portion 36 having an inturned edge 38, which retains an inner flange 40 in assembly therewith.

To provide means on the fastener 10 for receiving the flange 40 in snapping engagement, the resilient extension 30 is inclined outwardly and then inwardly, forming a camming surface 42 leading to a shoulder 44, which extends transversely across the resilient extension 30.

To support the fastener against inward tilting in the slot when the hub cap is assembled, the laterally extending portion 32 is so disposed on the arm 26 as to seat against the support and resist such tilting movement. To limit the distance the legs of the fastener can flex together, the leg 24 is provided with an embossed projection 46 which extends in spaced relation to the joined end 28 toward the other leg 26, and bears thereagainst when the legs are flexed together. (See Fig. 5.)

The individual fasteners are assembled into the slots 20 by simply inserting the U-shaped portion into the slot until the tongues 34 snap behind the support. The series of fasteners on a particular wheel are assembled so that the shoulders 44 all extend radially outwardly, and the laterally extending portions 32 all extend radially inwardly.

The hub cap 14 may then be assembled in the usual manner, by snapping the inner flange 40 over the shoulders 44 on the resilient arm extensions 30. Such engagement is aided by the camming surfaces 42 on the ends of the fasteners. It is also easier to start the hub cap onto the fasteners than with previous riveted resilient tongues, since with the present fastener, initial engagement is assisted by the fact that the initial flexing of the fasteners occurs easily, but then becomes stiffer as the projection 46 bears against the leg 26.

By the use of the fastener herein illustrated, only one type of wheel need be stocked on the assembly line, and at some later point the fasteners and a hub cap may be assembled or the fasteners may be omitted and a wheel cover assembled thereon.

Since certain obvious changes may be made in the device without departing from the scope of the invention, it is intended that all matter contained herein be interpreted in an illustrative and not in a limiting sense.

I claim:

1. A fastening device for snapping into a support opening to enable an article to be assembled onto the support in snapping engagement, with one side thereof comprising a U-shaped, stud-like portion formed by a pair of legs slightly spaced from and joined to one another at one end thereof, the free end of one of said legs being provided with a lateral arm extending substantially perpendicular therefrom and in a direction away from the other leg, a tongue on each side edge of said one leg and being inclined outwardly therefrom, the free end of each tongue extending in a direction away from the point of jointure of said legs and terminating at a point short of said arm and forming a space therebetween to receive an edge of the support in tight, non-tilting engagement therewith when the fastening device is inserted in the support opening, a resilient extension secured to the free end of the other leg, said extension having a snap shoulder portion thereon beyond the arm.

2. A fastening device in accordance with claim 1 wherein one of said legs is provided with embossed means to limit the movement of the legs toward one another.

References Cited in the file of this patent

UNITED STATES PATENTS

| | | |
|---|---|---|
| 2,055,047 | Place | Sept. 22, 1936 |
| 2,086,288 | Van Uum | July 6, 1937 |
| 2,175,814 | Pender | Oct. 10, 1939 |
| 2,193,951 | Van Uum | Mar. 19, 1940 |
| 2,547,031 | Lyon | Apr. 3, 1951 |